US011703892B2

(12) United States Patent
Norris

(10) Patent No.: US 11,703,892 B2
(45) Date of Patent: Jul. 18, 2023

(54) PRESSURE REGULATOR

(71) Applicant: Griswold Industries, Costa Mesa, CA (US)

(72) Inventor: Andrew Norris, Irvine, CA (US)

(73) Assignee: Griswold Industries, Costa Mesa, CA (US)

( * ) Notice: Subject to any disclaimer, the term of this patent is extended or adjusted under 35 U.S.C. 154(b) by 0 days.

(21) Appl. No.: 17/522,253

(22) Filed: Nov. 9, 2021

(65) Prior Publication Data

US 2022/0147073 A1    May 12, 2022

Related U.S. Application Data

(60) Provisional application No. 63/112,993, filed on Nov. 12, 2020.

(51) Int. Cl.
*G05D 16/10* (2006.01)
*F16K 31/122* (2006.01)
*F16K 17/04* (2006.01)
*G05D 16/06* (2006.01)

(52) U.S. Cl.
CPC ......... *G05D 16/106* (2013.01); *F16K 17/048* (2013.01); *F16K 31/1221* (2013.01); *G05D 16/0608* (2013.01); *Y10T 137/7808* (2015.04)

(58) Field of Classification Search
CPC .................. Y10T 137/7808; G05D 16/103
See application file for complete search history.

(56) References Cited

U.S. PATENT DOCUMENTS

| | | | |
|---|---|---|---|
| 614,441 A * | 11/1898 | Burnett | G05D 16/103 |
| | | | 137/508 |
| 5,257,646 A | 11/1993 | Meyer | |
| 5,396,918 A * | 3/1995 | Parker | G05D 16/0608 |
| | | | 138/45 |
| 5,881,757 A | 3/1999 | Kuster et al. | |
| 6,374,853 B1 * | 4/2002 | Callies | G05D 16/0608 |
| | | | 137/505.25 |
| 11,009,138 B2 | 5/2021 | Gammon | |
| 2005/0224117 A1 * | 10/2005 | Youngberg | G05D 16/0608 |
| | | | 137/505.25 |
| 2007/0028966 A1 * | 2/2007 | Feith | G05D 16/106 |
| | | | 137/505.25 |
| 2012/0227838 A1 * | 9/2012 | Ungerecht | F16K 1/123 |
| | | | 137/528 |
| 2014/0014190 A1 | 1/2014 | Bagagli et al. | |
| 2016/0096631 A1 | 4/2016 | Reinholdt et al. | |
| 2018/0010706 A1 * | 1/2018 | Reininger | F16K 27/0209 |
| 2020/0026313 A1 | 1/2020 | Weingarten | |

* cited by examiner

*Primary Examiner* — Robert K Arundale
*Assistant Examiner* — R. K. Arundale
(74) *Attorney, Agent, or Firm* — Kelly & Kelley, LLP

(57) ABSTRACT

A pressure regulator including a closure resisting mechanism that increases the total closure resisting force of a closure element to prevent the closure element from moving into a closed position until a predetermined pressure set point is reached. The closure resisting mechanism operates automatically and is spring actuated in response to pressure within a fluid pathway of the regulator. The closure resisting mechanism is disposed external to the fluid pathway so as not to impede fluid flow.

19 Claims, 10 Drawing Sheets

PRESSURE REGULATOR

RELATED APPLICATION

This application claims the benefit of U.S. Provisional Application No. 63/112,993, filed on Nov. 12, 2020.

FIELD OF THE INVENTION

The present invention is generally directed to pressure regulators. More particularly, the present invention is directed to a pressure regulator having a closure-resisting mechanism to increase the flow capacity through the regulator.

BACKGROUND OF THE INVENTION

A pressure regulator is a valve that controls the pressure of a fluid or gas to a desired value. The pressure regulator may be a pressure reducing regulator which reduces the input pressure of a fluid or gas to a desired value at its output. It is a normally open valve that is installed or positioned upstream of pressure sensitive equipment. The pressure regulator uses feedback of the regulated pressure as input to a control mechanism, such as actuated by a spring-loaded diaphragm or piston reacting to changes in the feedback pressure to control the valve opening.

Pressure regulation valves are used in a wide variety of applications, including fueling applications. The pressure regulator may be designed for use in aircraft or other refueling to protect the receiving aircraft or other transport vehicle from excess pressure and damage due to pressure surges. It is desirable in fueling applications that the pressure regulator not only provide surge pressure protection, but also that the overall pressure drop through the fully open valve be the lowest possible so as to contribute to shorter refueling times. Maximizing the gallons-per-minute during a refueling cycle results in the shortest duration to complete a fueling cycle, allowing an operator to fuel more planes, or other vehicles, in a day and prepare them for operation more quickly.

Pressure regulation valves with automatic spring actuation typically share a common performance shortcoming of beginning to constrict flow prior to the pressure set point of the regulator being reached while pressure begins increasing in the fluid pathway. In prior pressure regulators, flow is constricted by a closure element in the valve to introduce a pressure drop to the flow through the valve, reducing the inlet pressure to a lower downstream pressure. However, this constriction begins to act before the set point of the regulator is achieved, resulting in a limitation of the flow capacity that can be passed through the valve once the closure element of the regulator begins translating.

The nature of the helical compression spring design used in these regulators is such that there is a first load for the open position of a regulator and a second load for the closed position of the regulator. Helical compressions require that the first load is less than the second load due to wire deflection when compressed, resulting in the open position having a lower spring force than the closed position spring force within a regulator. This causes the regulator to begin closing at a pressure lower than set point as the first load of the spring is surpassed by the force developed by the pressure diameter of the closure element.

It would be desirable for the regulator to not choke flow until a particular pressure set point has been reached so as to increase the flow capacity through the regulator valve. The present invention fulfills this need, and provides other related advantages.

SUMMARY OF THE INVENTION

The present invention resides in a pressure regulator, such as a hose end pressure regulator, that is designed and configured to not choke flow or close until a particular pressure set point has been reached so as to increase the flow capacity through the regulator. The pressure regulator of the present invention maximizes flow during a flow cycle, such as a fueling cycle, and thus contributes to shorter flow or refueling cycle times.

The pressure regulator generally comprises a pipe defining a fluid pathway between a fluid inlet and a fluid outlet. A closure mechanism includes a seat within the pipe and a closure element movable between a biased open position spaced apart from the seat that permits fluid to flow through the fluid outlet and a closed position against the seat to inhibit or prevent the flow of fluid through the fluid outlet. A closure resisting mechanism is disposed outside of the fluid pathway. The closure resisting mechanism applies an additional open bias force, or a closure resisting force, to the closure element to prevent the closure element from moving into the closed position against the seat until a predetermined fluid pressure set point is reached, corresponding to a predetermined fluid pressure within the fluid pathway.

The pipe may be comprised of a hose adapter portion at one end and a nozzle adapter portion at an opposite end. A tube portion and a bulb portion are disposed between the hose adapter portion and nozzle adapter portion. The seat of the closure mechanism may be disposed within the bulb portion of the pipe.

The closure element may comprise a hollow tubular piston. The closure element may define at least a portion of the fluid pathway. The closure resisting mechanism may be disposed between an inner wall of the tube portion of the pipe and an outer wall of the closure element.

The closure mechanism includes a main spring that applies an opening bias force to the closure element. The main spring may comprise a helical compression spring.

The closure resisting mechanism includes a secondary holding spring that applies at least a portion of the force, or a closure resisting force, to the closure element. The holding spring may comprise a helical compression spring.

The closure resisting mechanism may include a collapse ring having free ends that are spaced apart from one another when the closure element is in an open position. The free ends are moved towards one another as the closure element moves towards the closed position. The collapse ring may be moved linearly within a tube having a first diameter portion and a second smaller diameter portion as the closure element is moved towards this closed position. The collapse ring may provide at least a portion of the closure resisting force to the closure element.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention is directed to a pressure regulator, generally referred to by the reference number 100. The pressure regulator of the present invention overcomes the shortcomings of prior pressure regulation valves with automatic spring actuation which begin to constrict flow prior to the pressure set point of the regulator being reached while pressure begins increasing in the fluid pathway.

Figure 1:
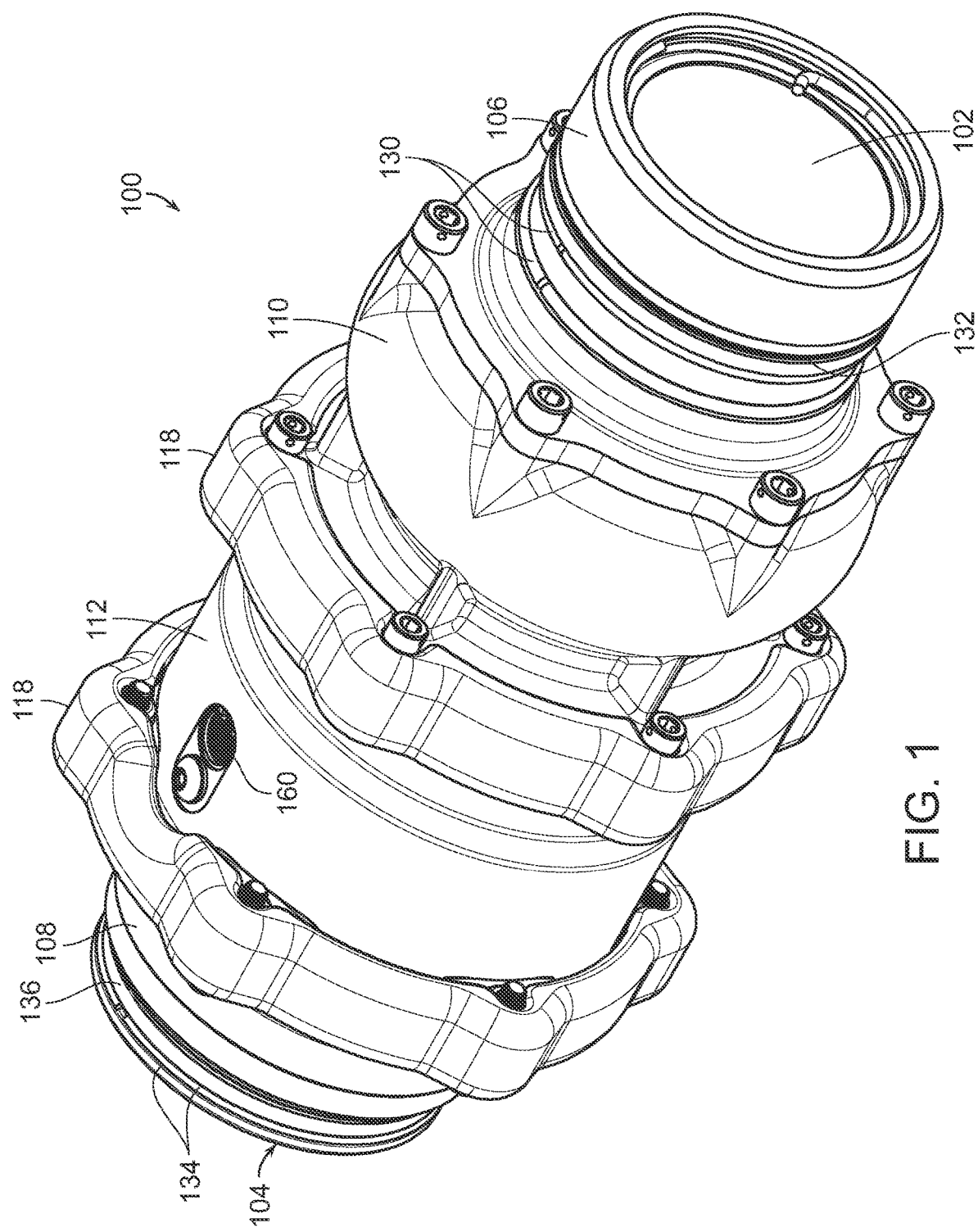
FIG. 1 is a perspective view of a pressure regulator embodying the present invention.

With reference to FIG. 1, the pressure regulator 100 of the present invention may be generally cylindrical and have a pipe configuration, as illustrated. The pressure regulator 100 includes a fluid inlet 102 at one end thereof and a fluid outlet 104 at an opposite end thereof, and defining a fluid pathway therebetween.

Figure 2:
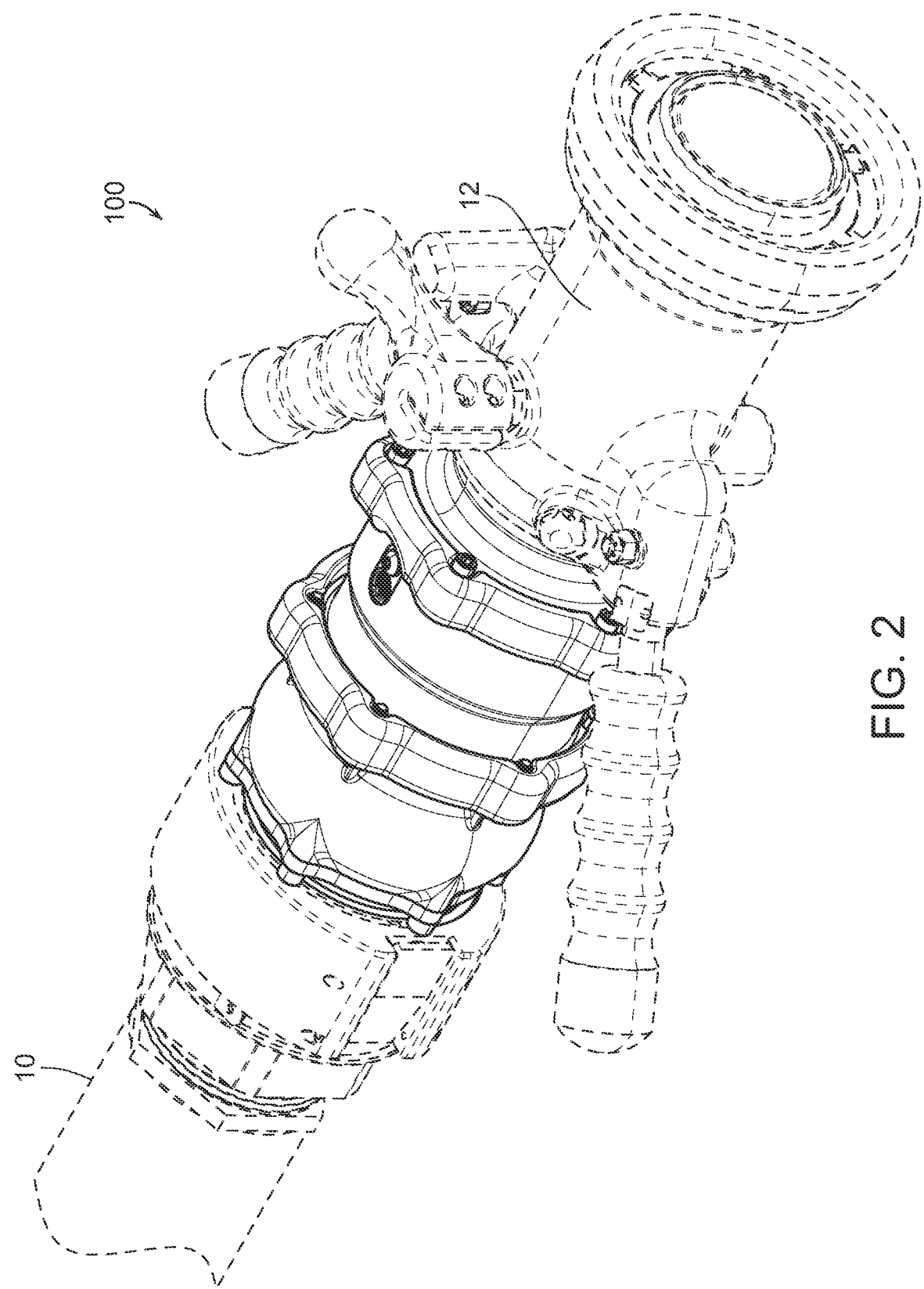
FIG. 2 is an environmental perspective view illustrating the pressure regulator connected to a hose at one end thereof and a nozzle at an opposite end thereof, such as in a fueling application, in accordance with the present invention.

With reference now to FIG. 2, the pressure regulator 100, sometimes referred to herein as a pressure control valve or pressure regulator valve, may be incorporated and/or used in connection with a fueling or other fluid transfer assembly. Such an assembly includes a hose assembly 10, which may include a break assembly for attachment and detachment of the hose assembly 10 to the pressure regulator 100, and a nozzle assembly 12 at an opposite end thereof. Fluid flows from the hose assembly 10, through the pressure regulator 100, and to the nozzle assembly 12. The nozzle assembly 12 may be connectable to a fuel port of a vehicle, such as an aircraft, rail car engine, an automobile, a boat, or any other vehicle. It will also be understood that while the present invention is particularly adapted for use in fueling applications, it can also be utilized in other applications where fluid is transferred from one tank or location to another. It will be understood that the fueling or fluid tank to which the hose assembly is connected to and extends from may be stationary, such as an above-ground tank or even a subterranean tank, or mobile, such as a fuel tanker truck or the like. The pressure regulator 100 of the present invention maximizes the gallons per minute during a fluid transfer cycle, such as a refueling cycle, resulting in the shortest duration to complete such fueling cycle, allowing an operator to fuel more planes, or other vehicles, tanks, etc., in a day or over a given period of time.

With reference now to FIGS. 1-4, the pipe, forming the main body of the pressure regulator, may be comprised of a plurality of sections or portions, as illustrated. At the inlet end of the pressure regulator 100 is an upstream hose adapter portion 106. The hose adapter portion 106 acts as a pressure boundary and provides means for connecting the pressure regulator 100 to a fluid flow path, such as a hose. At the generally opposite end of the pressure regulator 100 is a downstream nozzle adapter portion 108, which acts as a pressure boundary and provides means for connecting the pressure regulator 100 to a flow path, such as a nozzle. A bulb portion 110 and a tube portion 112 are disposed between the hose adapter portion 106 and the nozzle adapter portion 108. Typically, the bulb portion 110 is connected to the hose adapter portion 106 and the tube portion 112 is connected to the nozzle adapter portion 108, as illustrated. These portions 106-112 collectively form the main body pipe of the pressure regulator 100. It will be understood, however, that the pressure regulator 100 may include additional segments or portions, or fewer segments or portions.

Figure 3:
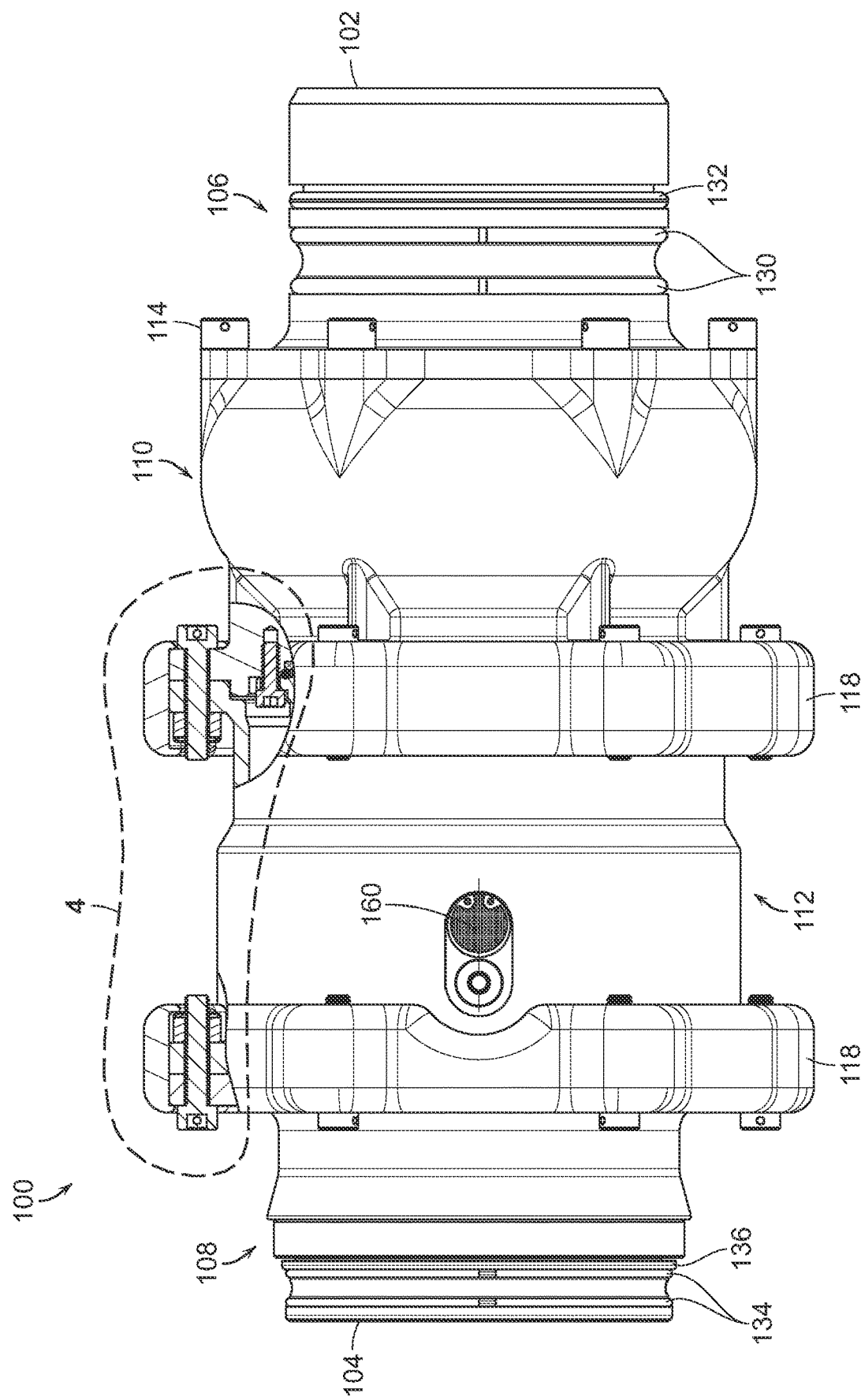
FIG. 3 is a top and partially sectioned view of the pressure regulator, illustrating interconnection of portions thereof, in accordance with the present invention.
Figure 4:
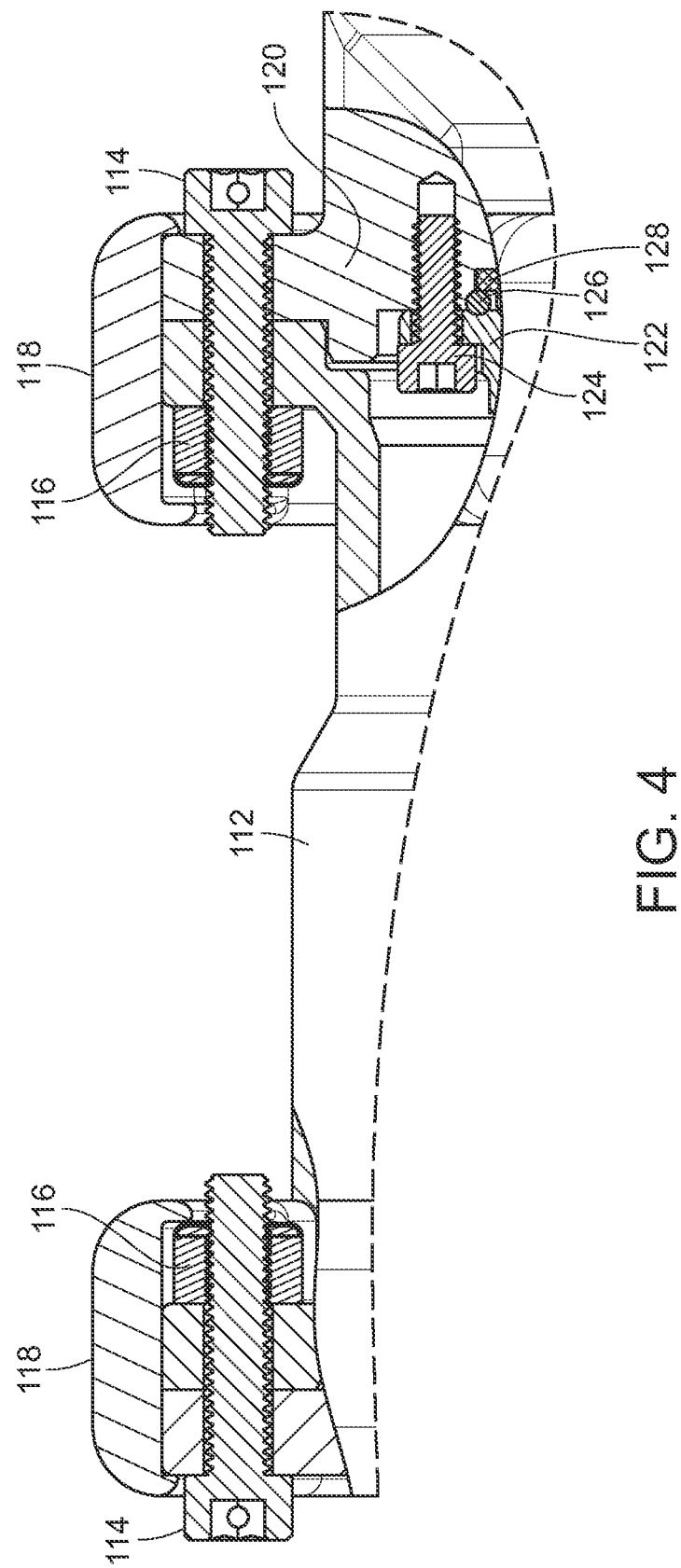
FIG. 4 is an enlarged cross-sectional view of area "4" of FIG. 3.

With particular reference to FIGS. 3 and 4, fasteners, such as screws 114 and nuts 116, may be used to securely connect the portions 106-112 to one another. Protective bumpers 118, such as being comprised of elastomeric material or the like, may be disposed over these connection points and any other sensitive areas of the pressure regulator 100 to protect these areas against damage as the pressure regulator 100 is in use and may come in contact with the ground or other objects. In this manner, the pressure regulator 100 is protected from impact damage if dropped during usage or handling, or otherwise comes into abrupt and forceful contact with other objects.

With continuing reference to FIGS. 3 and 4, a gland retainer 120 contains a gland ring 122 and maintains structural integrity of the upstream closure element seal glands. Gland retaining screw 124 affixes the gland retainer to the bulb portion 110, providing structural clamping of the gland retainer 120 to resist pressure loads transferred like by closure element, O-rings and seals and the like, including O-ring 126 and closure element seal 128.

With reference to FIGS. 1 and 3, the hose adapter portion 106 may include one or more upstream race rings 130 to provide a surface for ball bearings of the hose connector to roll against the hose end adapter portion 106 in a ball race swivel joint between the pressure regulator 100 and the upstream flow path. An O-ring 132 or swivel ring may perform a sealing function at the upstream joint between the pressure regulator 100 and the hose assembly 10 to prevent release of service fluid to the atmosphere. Similarly, at the downstream end at the nozzle adapter portion 108 one or more race rings 134 may provide a surface for ball bearings of the nozzle assembly 12 to roll against the adapter portion 108 in a ball race swivel joint between the pressure regulator 100 and the downstream flow path. Also, an O-ring or swivel ring 136 may provide a wear-resistant bearing and perform a sealing function at the downstream joint between the nozzle adapter portion 108 and the nozzle assembly 12 to prevent release of service fluid to the external atmosphere.

Figure 5:
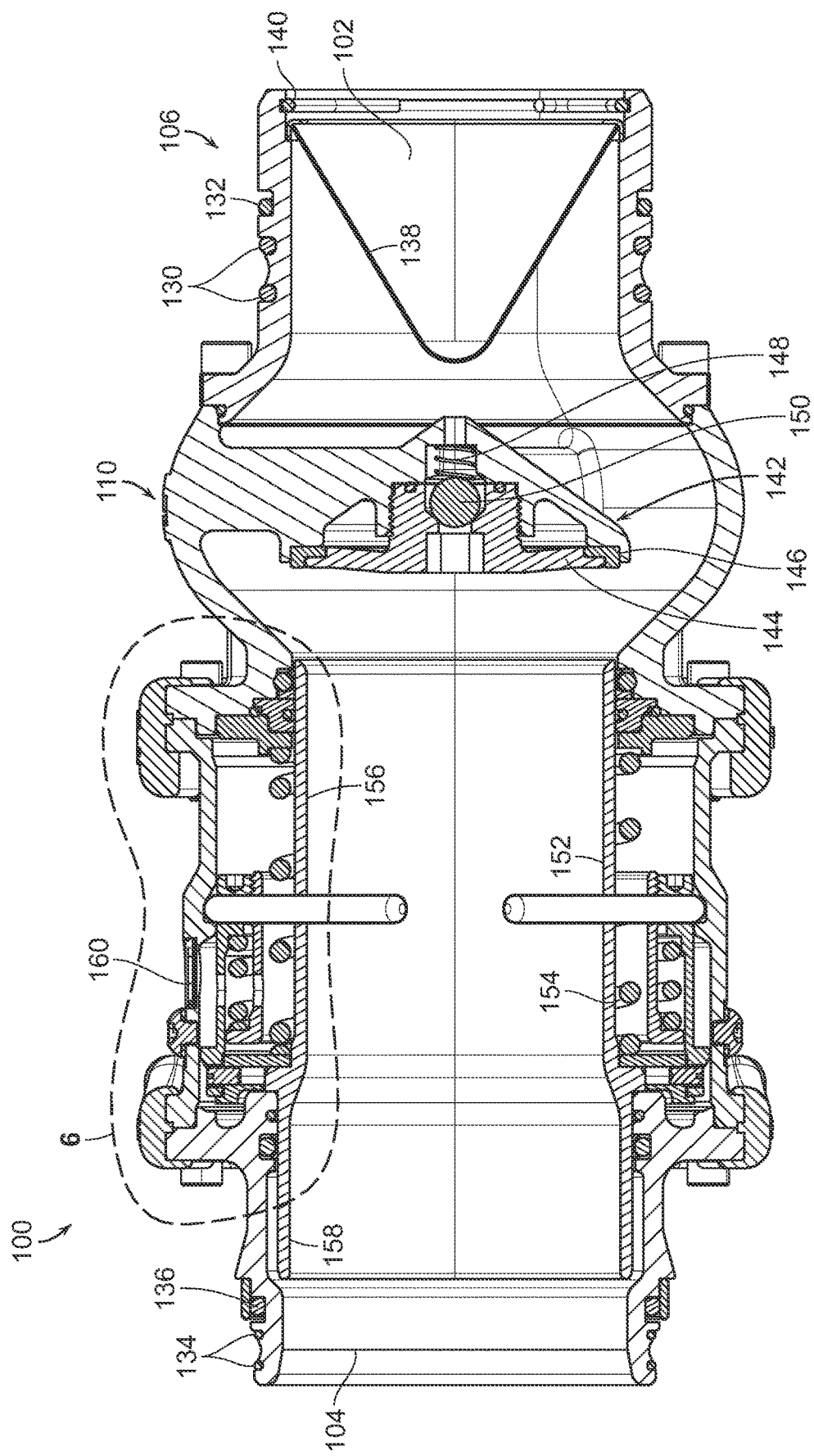
FIG. 5 is a cross-sectional view of the pressure regulator in an open position.

With reference now to FIG. 5, a strainer 138 strains the flow through the regulator valve 100, removing particulate matter via wire mesh openings in a conical configuration, as illustrated. This is a replaceable, optional trim component of the pressure regulator 100. A retaining ring 140 provides a means for mechanically retaining the strainer screen 138 within the pipe of the pressure regulator 100, such as in the hose adapter portion 106, as illustrated.

With continuing reference to FIG. 5, the bulb portion of the pipe 110 acts as a pressure boundary and houses a seat assembly 142 of a closure mechanism of the pressure regulator 100 used for closure of the main flow through the pressure regulator 100. The seat retainer 144 is affixed to the bulb portion 110 and provides attachment and housing of a seat 146 and a relief ball check feature. The seat retainer 144 holds the seat 146, which is typically comprised of an elastic material, in place. The seat retainer 144 may be a replaceable trim component.

The seat retainer 144 also provides housing for the relief ball check feature, which comprises a relief spring 148 which is a helical compression spring that provides a resisting load that tends to keep an elastomeric ball 150 in the closed position when loaded or unloaded by pressure. The relief spring 148 allows for translation of the elastomeric ball 150 off of the seat 144 when a positive pressure differential is developed in the downstream-to-upstream direction, relieving downstream pressure when the upstream pressure is lower than the downstream pressure. The ball 150 is an elastomeric sphere that acts as the closure element of the relief feature in the seat retainer 144 and bulb portion 110. The ball 150 allows pressure to pass from downstream to upstream when a differential is developed, and seals against a pressure differential in the upstream to downstream direction.

Figure 7:
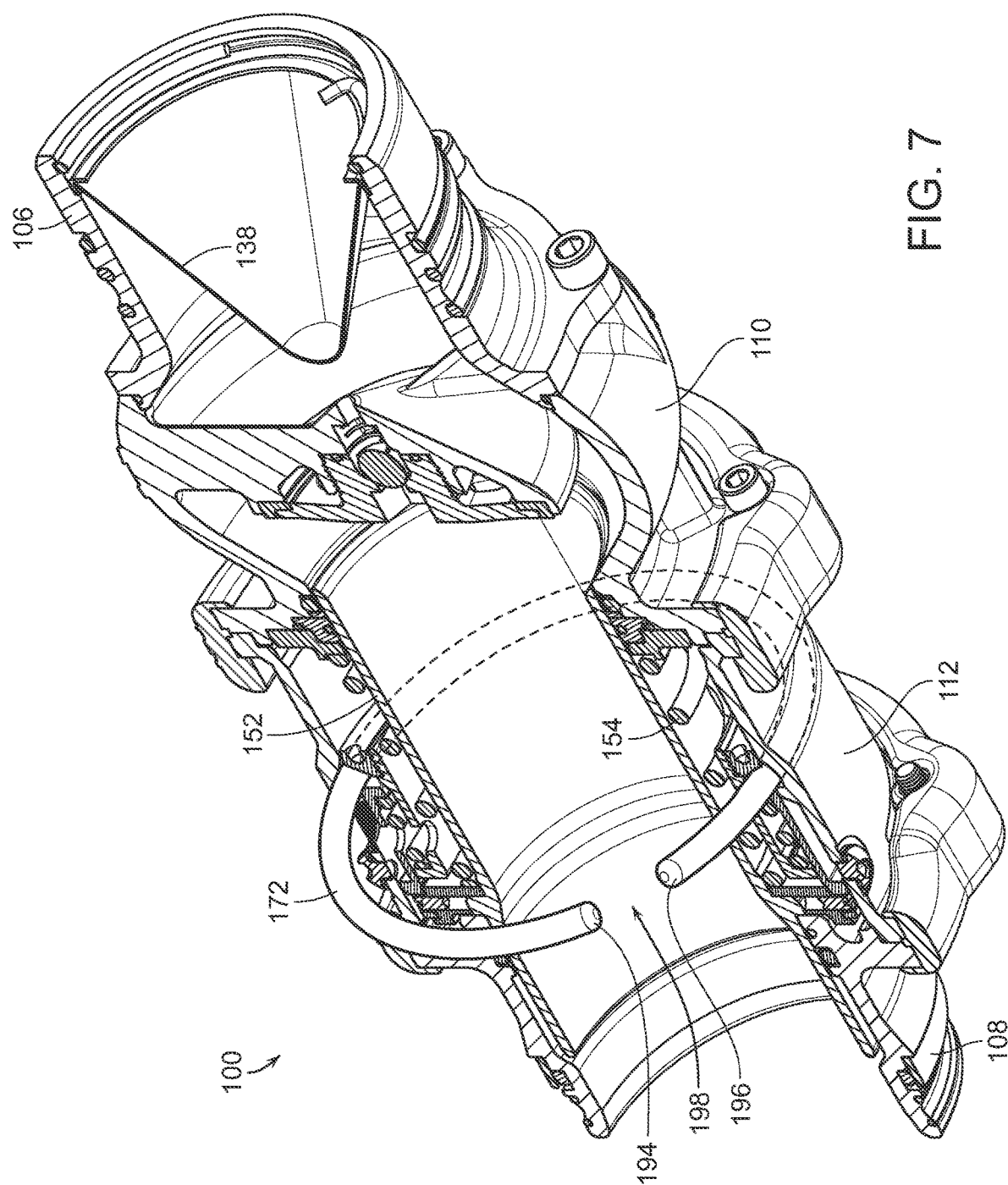
FIG. 7 is a partially sectioned view of the pressure regulator in an open position.
Figure 8:
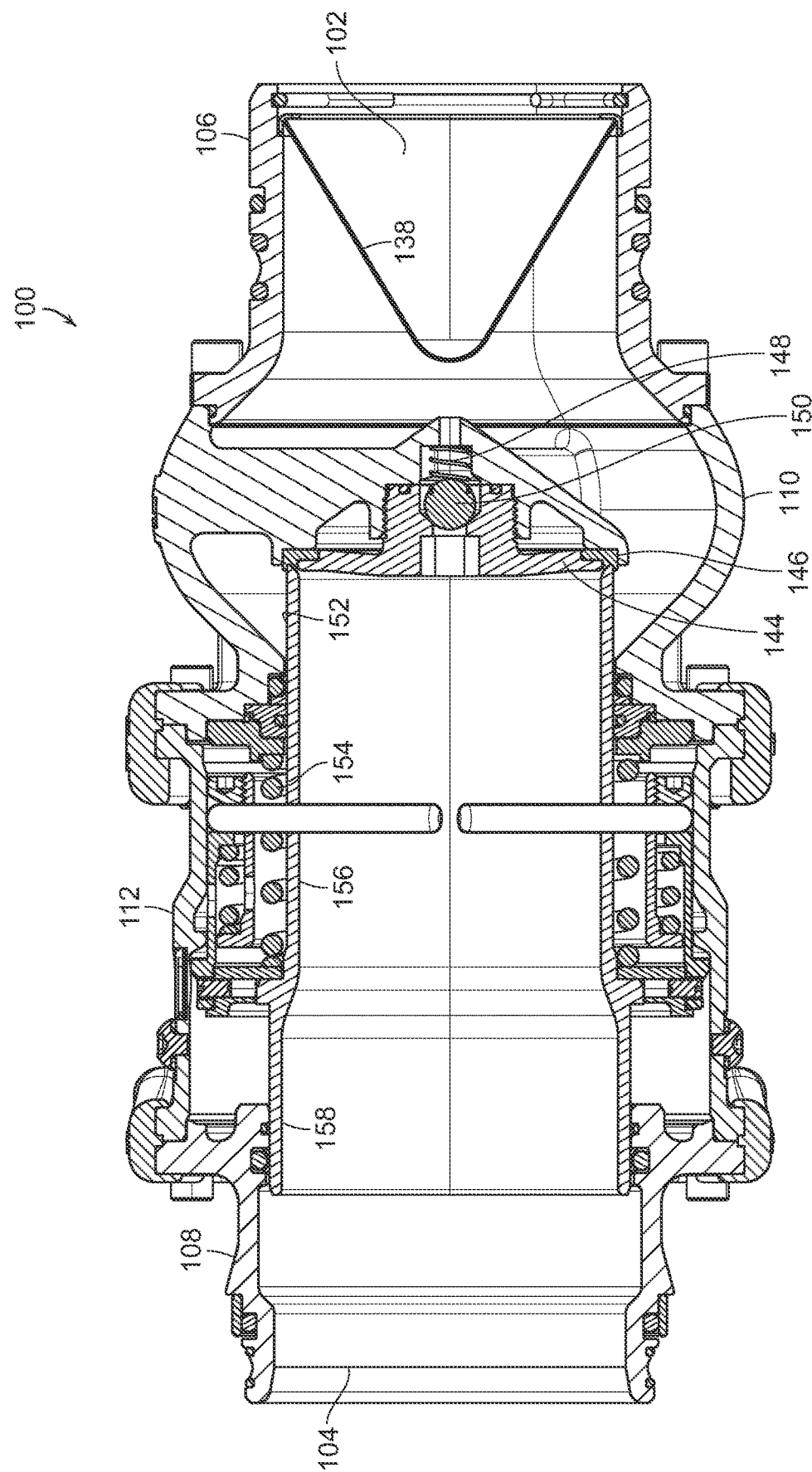
FIG. 8 is a cross-sectional view of the pressure regulator in a closed position.
Figure 9:
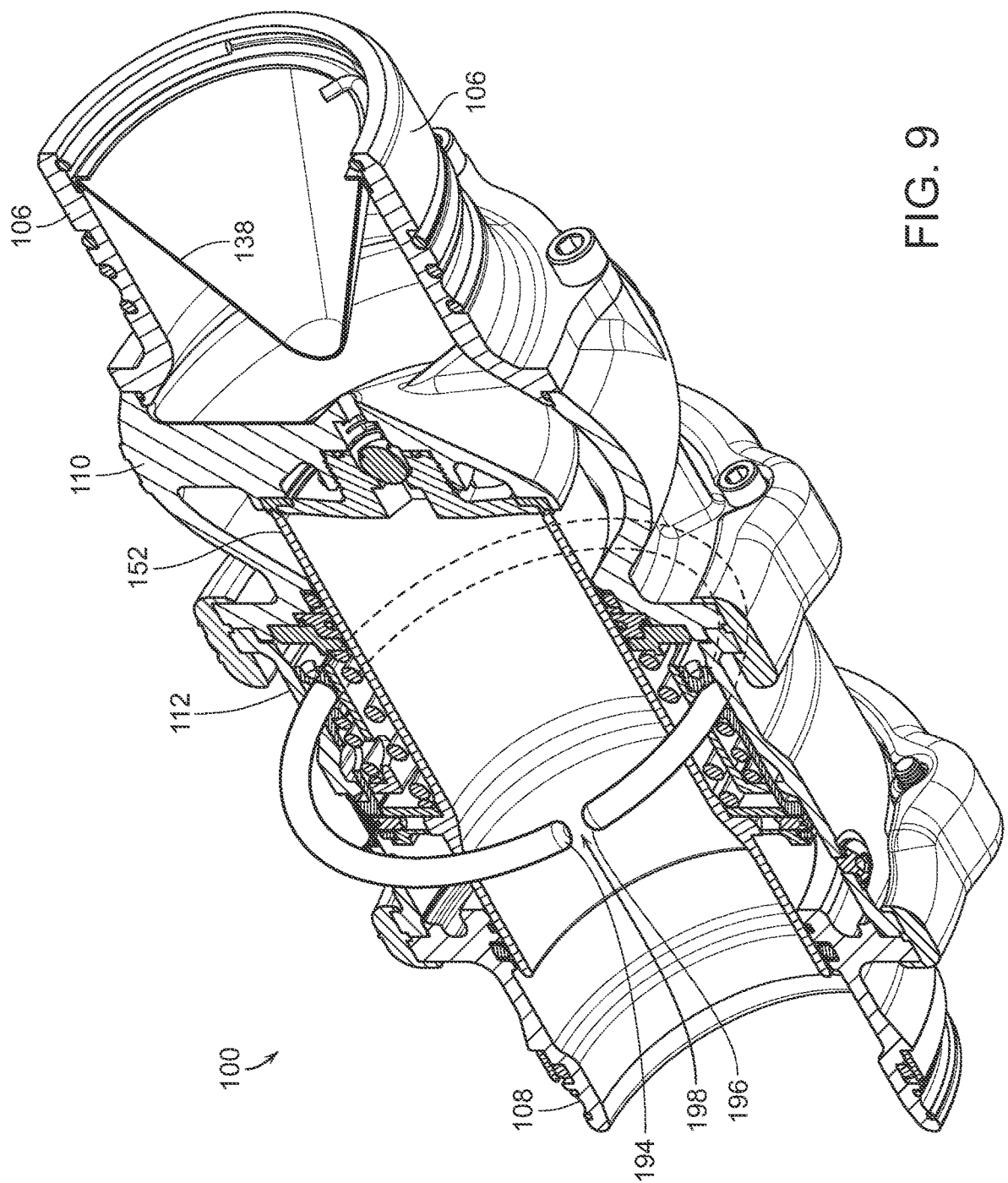
FIG. 9 is a partially sectioned view of the pressure regulator in a closed position.

The closure mechanism also includes a closure element 152 which is movable between a biased open position, spaced apart from the seat 146, as illustrated in FIGS. 5 and 7, and a closed position against the seat 146, as illustrated in FIGS. 8 and 9 to inhibit or prevent the flow of fluid through the fluid outlet 104 of the pressure regulator 100. The closure mechanism also includes a main spring 154, which may be a compression spring, that biases the closure element 152 in an open position. The main spring 154 may be a helical compression spring that provides resisting load that tends to open the closure element 152. The main spring 154 compresses under internal pressure load, allowing the main flow path to be shut off at a specified main flow downstream pressure.

The closure element 152, in a particularly preferred embodiment, as illustrated herein, has a hollow tubular configuration such that fluid flows therethrough, and the closure element 152 defines at least a portion of the fluid pathway through the pressure regulator 100. This portion of the fluid pathway is defined by the inner surface of the tubular closure element 152. The closure element 152 has two different sealing diameters to create a pressure area, such as the portion 156 of a smaller diameter and portion 158 of a larger diameter. The pressure area acts between atmospheric pressure and internal fluid pressure, creating a differential pressure that acts against the spring forces of main spring 154 resisting the closure element's piston translation towards the closed position.

An aperture is formed in the pipe, such as through the tube portion 112 and a screen 160, such as in the form of a wire mesh disk, is inserted into the aperture to provide atmospheric pressure to the closure element piston 152 or the pressure area differential. When the pressure differential overcomes the biasing of the main spring 154 the closure element 152 moves towards the closed position until it contacts the seal 146. The seal 146 may be comprised of an elastomeric material and the closure element sealing edge compressing against the seal 146 during closure shuts off flow through the pressure regulator 100. This prevents fluid from flowing through the fluid pathway and out of the fluid outlet 104 of the pressure regulator valve 100. This occurs when the downstream pressure increases sufficiently to a point to overcome the forces of the bias of the main spring 154. The pressure differential between portions 156 and 158 of the closure element piston 152 results in these forces acting against compression spring 154 until the spring forces are overcome and the closure element is moved into the closed position against the seal 146.

Figure 6:
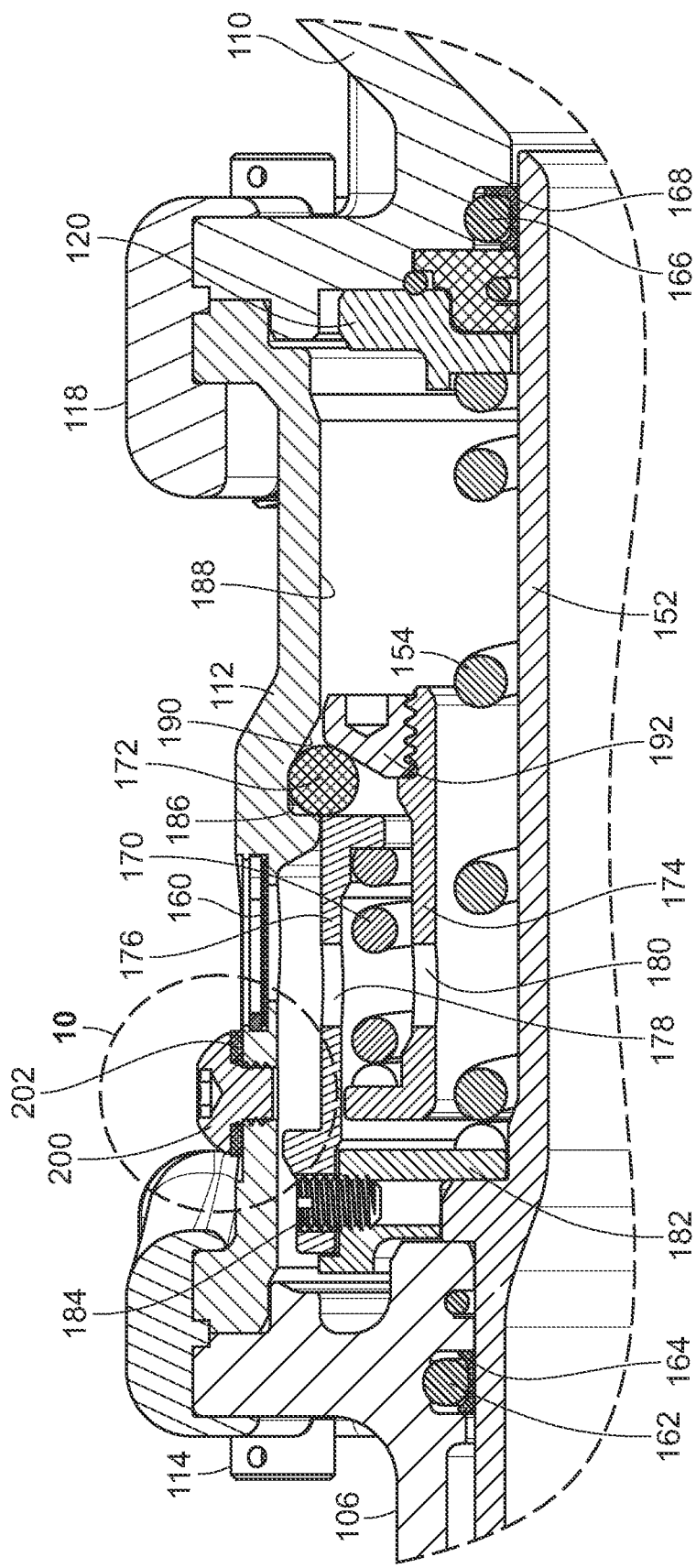
FIG. 6 is an enlarged cross-sectional view of area "6" of FIG. 5, illustrating a closure resisting mechanism embodying the present invention.

With reference now to FIG. 6, a downstream piston O-ring seal 162 and a cap seal 164 provides a low-friction seal between internal pressure and external atmospheric pressure at the closure element outside diameter portion 158. Similarly, when upstream O-ring seal 166 and cap seal 168 provides a low-friction seal between internal pressure and external atmospheric pressure at the outside surface of the smaller diameter portion 156 of the closure element 152.

As mentioned above, a common performance shortcoming of such pressure regulators is the beginning to constrict flow prior to the predetermined pressure setpoint of the pressure regulator being reached while pressure begins increasing in the fluid pathway. This results in a limitation of the flow capacity that can be passed through the pressure regulator valve once the closure element of the pressure regulator begins translating towards the closed position. The pressure regulator begins closing at a pressure lower than the setpoint as the first load of the main spring 154 is surpassed by the force developed by the pressure diameter of the closure element 152.

To increase the flow capacity through the pressure regulator valve 100, the closure element 152, sometimes referred to herein as a piston, must be held open with force equal to or exceeding the first load of the spring 154 actuating the closure element 152. This effectively increases the initial pressure value at which the regulator 100 begins to close and constrict flow. The pressure regulator valve 100 of the present invention has been designed to integrate a closure resisting mechanism that provides additional linear force in the direction of the main regulating compression spring 154 at the open position, increasing the total force resisting the closure element 152. The closure resisting mechanism operates automatically and is spring actuated in response to pressure loads developed by the main flow path of the pressure regulator valve 100. One advantage of the present invention is that the closure resisting mechanism is external to the fluid flow path of the pressure regulator 100, maximizing the area of the internal flow path within the pressure regulator 100 to provide the greatest capacity for the envelope size of the valve.

The closure resisting mechanism includes a secondary holding spring 170 that applies an additional open bias force, or a closure resisting force, to the closure element to prevent the closure element from moving into the closed position against the seat 146 until a predetermined fluid pressure set point is reached. The secondary holding spring 170 may comprise a helical compression spring. Typically, as will be more fully described herein, the closure resisting mechanism also includes a collapse ring 172 which provides at least a portion of the additional open bias force or closure resisting force, to the closure element 152 to temporarily hold it open and prevent the closure element 152 from moving into the closed position against the seat 146 until a predetermined fluid pressure set point is reached.

As mentioned above, one benefit of the present invention is that the closure resisting mechanism is disposed outside of the fluid flow pathway of the pressure regulator 100. This may be done, as illustrated herein, with the closure resisting mechanism being disposed between an inner wall of the tube portion 112 and an outer wall of the closure element 152, as illustrated in FIG. 6.

The closure resisting mechanism includes a sleeve mechanism comprising an inner sleeve 174 and an outer sleeve 176. The wire mesh screen 160 allows air exchanges into the sleeve mechanism cavity through the tube portion 112. Air flow passageways 178 and 180 may be formed through the sleeve mechanism to provide atmospheric air to the main spring 154, as needed.

A yoke 182 mechanically couples the loads at the closure element 152 to the outer sleeve 176. A yoke set screw 184 may provide coupling between the yoke 182 and the outer sleeve 176. The outer sleeve 176 provides a means for translating the pressure load applied to the closure element 152 to the collapse ring 172. The inner sleeve 174 provides means for compressing the resetting sleeve secondary holding spring 170 in response to the collapse ring 152 wedging radially inward during deflection, providing additional load to the closure element 152 at the open position. As can be seen in the illustrations, such as in FIG. 6, the secondary holding spring 170 is disposed within the cavity between the inner and outer sleeve 174 and 176.

The collapse ring 172 is disposed within a tube having varying diameters. The tube may comprise the inner surface of the tube portion 112, as illustrated. In the open position, where the closure element 152 is spaced away from the seal 146, the collapse ring 172 is disposed within a tube groove 186 having a first diameter portion which is larger than a second diameter portion 188 of the tube. Typically, there is a ramp portion 190 between the groove tube 186 and the second smaller diameter portion 188. The tube 112 joins pressure boundaries and contains the profile for the deflecting collapse ring 172.

A wedge ring 192 provides a means for a spring load to resist the inward deflection of the collapse ring 172, maintaining the collapse ring 172 in the larger diameter portion of the tube groove 186 until sufficient pressure is developed in the main flow path of the pressure regulator 100. The wedge ring 192 is attached to the inner sleeve 174 and with the secondary holding spring 170 installed provides additional compression force at the open position as it holds the collapse ring 172 in place in the larger diameter tube bore 186.

With reference now to FIG. 7, the collapse ring 172 is a toroidal ring with a section cut out or removed so as to create free ends 194 and 196, spaced apart from one another to form a gap or space 198 therebetween. When the closure element 152 is in the open position, as illustrated in FIG. 7, the free ends 194 and 196 of the collapse ring 172 are spaced apart from one another a relatively large degree to create a large space 198 therebetween. However, as downstream pressure increases within the pressure regulator 100, the collapse ring 172 is moved linearly within the tube from the tube groove having the first diameter portion towards the second smaller diameter portion 188 of the tube. This causes deflection in the radial direction of the collapse ring 172 such that the free ends 194 and 196 come closer to one another and the space 198 therebetween decrease as the closure element 152 is moved into the closed position, as illustrated in FIG. 9.

As mentioned above, the outer sleeve 176 is coupled to the closure element 152, thereby translating the pressure load from the flow path to components of the closure resisting mechanism. The outer sleeve 176 loads the collapse ring 172 linearly as pressure increases in the main flow path. The conical ramp section 190 of the internal profile of the tube 112 provides a first component in the inward radial direction as the outer sleeve 176 loads the collapse ring 172. After sufficient load is developed in the secondary spring 170 of the mechanism, the collapse ring 172 deflects radially inwardly enough to slip into the smaller inside diameter portion 188 of the tube 112, no longer resisting the travel of the closure element 152 in the pressure regulator 100. The pressure regulator 100 then controls pressure normally with piston translation of the closure element 152 and constriction to introduce a pressure drop across the seating edge of the closure element 152.

The collapse ring 172 acts as a locking feature which prevents closure of the closure element 152 until sufficient pressure is developed, whereby it loads the wedge ring 192 sufficiently to be able to deflect inwardly sufficiently to fit inside the smaller bore 188 of the tube 112 as the piston closure element 152 is moved into the closed position. Thus, it can be seen in FIG. 7 that the gap or space 198 between the free ends 194 and 196 of the collapse ring 172 is open and large when the piston closure element 152 is in an open position, and thus the collapse ring 172 is in a more relaxed position.

However, as the piston closure element 152 begins to close towards a closed position, as illustrated in FIG. 9, the collapse ring 172 is moved from the tube groove 186 along the ramp portion 190 and into the smaller diameter portion 188 of the tube and along the wedge ring 192 against the resisting load of the resetting sleeve spring or secondary holding spring 170. The secondary holding spring 170 and wedge ring 192 configuration in conjunction with the collapse ring 172 and the movement of the collapse ring 172 to an increasingly compressed state, as illustrated and described above, serves to hold open the closure element 152 below a pressure threshold, which increases the number of gallons of fluid, such as fuel, passed through the pressure regulator 100 as pressure begins to rise within the fluid flow pathway.

Thus, the pressure regulator 100 does not choke flow until a particular predetermined pressure set point has been reached to overcome this wedging and resisting spring load, after which the pressure regulator 100 will regulate flow like usual, without the hold-open feature. In other words, the wedge mechanism reaches a threshold after which it can no longer hold the pressure regulator 100 open, and the pressure regulator 100 begins to choke flow to reduce downstream pressure, which also reduces the flow rate and gallons-per-minute through the pressure regulator 100 until it is closed. As described and illustrated above, this is accomplished outside of the fluid pathway so as not to construct fluid flow through the pressure regulator device 100.

A buttonhead screw 200 closes the threaded holes in the tube 112 during normal use to mitigate dirt accumulation in the tube. A washer 202 provides a wear-resisting surface for the button screw 200 to be torqued against the tube 112, while also ensuring that the button screw 200 cannot insert and interfere with the outer sleeve 176.

Figure 10:
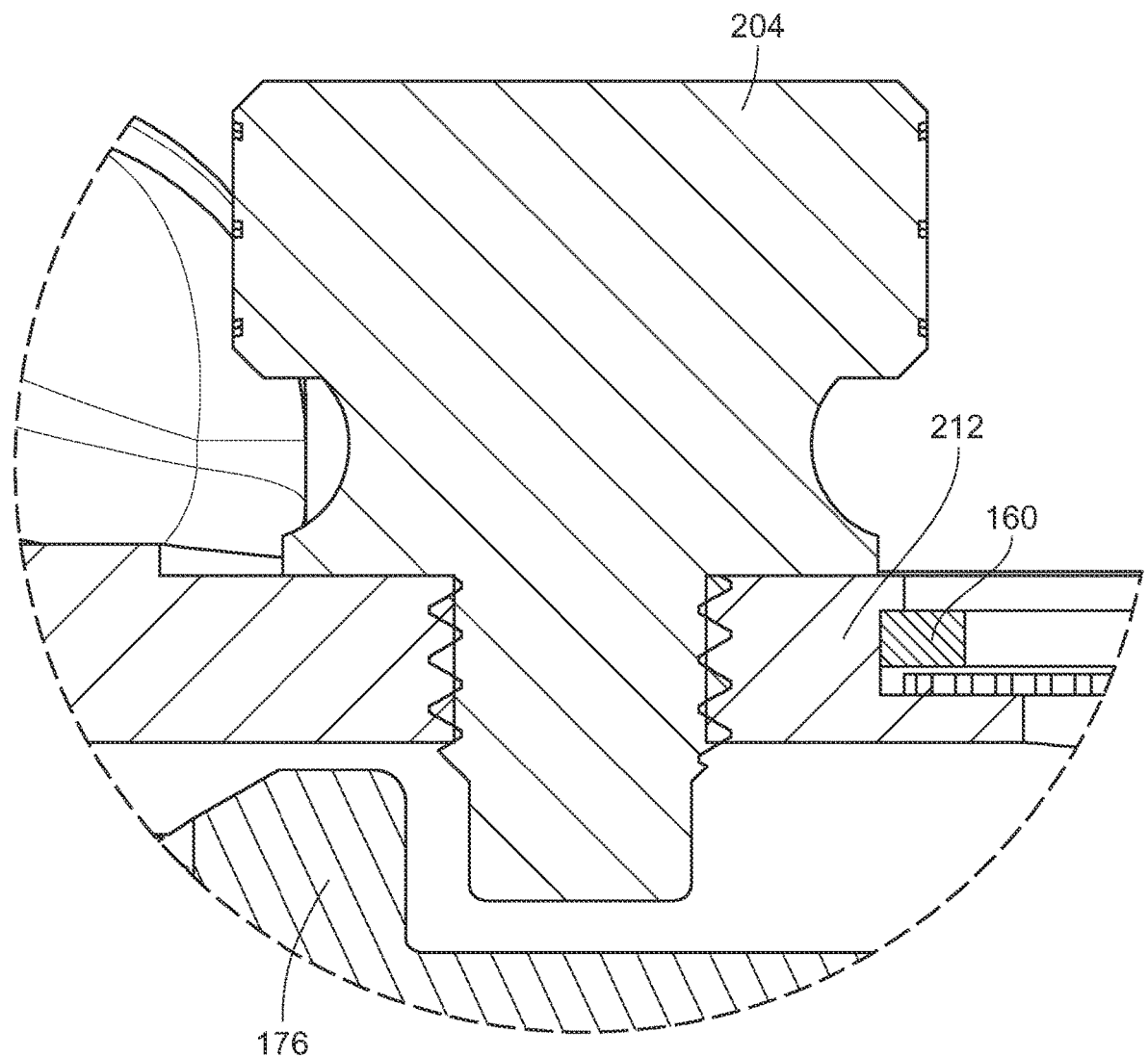
FIG. 10 is an enlarged cross-sectional view of area "10" of FIG. 6, illustrating a locking thumb screw, used in accordance with the present invention.

With reference now to FIG. 10, in place of the buttonhead screw 200, a locking thumb screw 204 may be inserted in its place within the aperture of the tube 212. The thumb screw 204 acts as a lockout device when threaded into the tube, blocking the resetting sleeve mechanism, resulting in holding the piston closure element 152 open when internal pressures would normally begin closing the closure element 152. The regulator 100 can be deactivated by installing this lockout screw, so as not to constrict the flow path in response to pressure changes due to the linear travel of the outer sleeve 176 being blocked by the interfering feature of the lockout screw 204. The buttonhead socket cap screw 200 is installed for normal operation where the regulation feature of the regulator valve 100 is active, as discussed above.

The pressure regulator 100 also preferably includes a number of additional O-rings and other seals. It may include O-rings and seals to prevent internal pressure and fluid from releasing to the external atmosphere. It may also include O-rings and seals between the portions 106-112 of the pipe, O-rings and seals that facilitate linear translation of the closing element 152 in a sealed manner, as well as sealing between the seat retainer 144 and the bulb portion 110 of the pipe. Additional O-rings and seals may be incorporated into the pressure regulator 100 as needed.

Although several embodiments have been described in detail for purposes of illustration, various modifications may be made without departing from the scope and spirit of the invention. Accordingly, the invention is not to be limited, except as by the appended claims.

What is claimed is:

1. A hose end pressure regulator, comprising:
   a pipe defining a fluid pathway between a fluid inlet and a fluid outlet;
   a closure mechanism including a seat within the pipe and a closure element movable between a biased open position spaced apart from the seat that permits fluid to flow through the fluid outlet and a closed position against the seat to inhibit or prevent the flow of fluid through the fluid outlet; and
   a closure resisting mechanism disposed outside of the fluid pathway that applies a closure resistance force to the closure element to prevent the closure element from moving into the closed position against the seat until a predetermined fluid pressure set point is reached;
   wherein the closure resisting mechanism includes a collapse ring having free ends that are spaced apart from one another when the closure element is in an open position and moved towards one another as the closure element moves towards the closed position.

2. The pressure regulator of claim 1, wherein the pipe is comprised of a hose adapter portion at one end, a nozzle adapter portion at an opposite end, and a tube portion and a bulb portion disposed between the hose adapter portion and nozzle adapter portion.

3. The pressure regulator of claim 2, wherein the seat of the closure mechanism is disposed within the bulb portion of the pipe.

4. The pressure regulator of claim 2, wherein the closure resisting mechanism is disposed between an inner wall of the tube portion and an outer wall of the closure element.

5. The pressure regulator of claim 1, wherein the closure element comprises a hollow tubular piston.

6. The pressure regulator of claim 5, wherein the closure element defines at least a portion of the fluid pathway.

7. The pressure regulator of claim 1, wherein the closure mechanism includes a main spring that applies an opening bias force to the closure element.

8. The pressure regulator of claim 7, wherein the main spring comprises a helical compression spring.

9. The pressure regulator of claim 1, wherein the closure resisting mechanism includes a secondary holding spring that applies at least a portion of the closure resistance force to the closure element.

10. The pressure regulator of claim 9, wherein the holding spring comprises a helical compression spring.

11. The pressure regulator of claim 1, wherein the collapse ring is moved linearly within a tube having a first diameter portion and a second smaller diameter portion as the closure element is moved towards the closed position.

12. The pressure regulator of claim 1, wherein the collapse ring provides at least a portion of the closure resistance force to the closure element.

13. A hose end pressure regulator, comprising:
    a pipe defining a fluid pathway between a fluid inlet and a fluid outlet;
    a closure mechanism including a seat within the pipe and a closure element configured as a hollow tubular piston at least partially defining the fluid pathway and movable between a main spring biased open position spaced apart from the seat that permits fluid to flow through the fluid outlet and a closed position against the seat to inhibit or prevent the flow of fluid through the fluid outlet; and
    a closure resisting mechanism disposed between the pipe and the closure mechanism and outside of the fluid pathway, including a sleeve mechanism coupled to the closure element and a secondary holding spring associated with the sleeve mechanism that applies an additional linear a closure resistance force to the closure element in a direction of the force of the main spring when the closure element is in an open position to prevent the closure element from moving into the closed position against the seat until a predetermined fluid pressure set point is reached;
    wherein the pipe is comprised of a hose adapter portion at one end, a nozzle adapter portion at an opposite end, and a tube portion and a bulb portion disposed between the hose adapter portion and nozzle adapter portion; and
    wherein the closure resisting mechanism includes a collapse ring having free ends that are spaced apart from one another when the closure element is in an open position and moved towards one another as the closure element moves towards the closed position.

14. The pressure regulator of claim 13, wherein the seat of the closure mechanism is disposed within the bulb portion of the pipe.

15. The pressure regulator of claim 13, wherein the main spring comprises a helical compression spring.

16. The pressure regulator of claim 13, wherein the holding spring comprises a helical compression spring.

17. The pressure regulator of claim 13, wherein the collapse ring is moved linearly within a tube having a first diameter portion and a second smaller diameter portion as the closure element is moved towards the closed position.

18. The pressure regulator of claim 13, wherein the collapse ring provides at least a portion of the closure resistance force to the closure element.

19. A hose end pressure regulator, comprising:
    a pipe defining a fluid pathway between a fluid inlet and a fluid outlet;
    a closure mechanism including a seat within the pipe and a closure element comprising a hollow tubular piston at least partially defining the fluid pathway and movable between a main spring biased open position spaced apart from the seat that permits fluid to flow through the fluid outlet and a closed position against the seat to inhibit or prevent the flow of fluid through the fluid outlet; and
    a closure resisting mechanism disposed between the pipe and the closure mechanism and outside of the fluid pathway;
    wherein the closure resisting mechanism includes a secondary holding spring that applies an additional linear closure resistance force to the closure element in a direction of the force of the main spring when the closure element is in an open position;

wherein the closure resisting mechanism includes a collapse ring, the collapse ring having free ends spaced apart from one another when disposed within a first diameter portion of a tube, the free ends moved towards one another as the collapse ring moves linearly to a second portion of the tube of smaller diameter as the closure element moves towards a closed position; and wherein the collapse ring and the secondary holding spring cooperate with the main spring to prevent the closure element from moving into the closed position against the seat until a predetermined fluid pressure set point is reached.

* * * * *